US011017045B2

(12) United States Patent
Kleiner et al.

(10) Patent No.: US 11,017,045 B2
(45) Date of Patent: May 25, 2021

(54) PERSONALIZED USER EXPERIENCE AND SEARCH-BASED RECOMMENDATIONS

(71) Applicant: MICROSOFT TECHNOLOGY LICENSING, LLC, Redmond, WA (US)

(72) Inventors: Madeline Schuster Kleiner, Mercer Island, WA (US); Bernhard Kohlmeier, Seattle, WA (US); Daniel Fairweather, Sammamish, WA (US); Tomasz Lukasz Religa, Seattle, WA (US); Pankaj Gaur, Redmond, WA (US); Vincent Etter, Kirkland, WA (US); Geoffrey John Hulten, Lynnwood, WA (US); Jignesh Shah, Redmond, WA (US); Robert Rounthwaite, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 16/195,819

(22) Filed: Nov. 19, 2018

(65) Prior Publication Data

US 2020/0159862 A1    May 21, 2020

(51) Int. Cl.
*G06F 16/9535* (2019.01)
*G06F 9/451* (2018.01)
(Continued)

(52) U.S. Cl.
CPC ........ *G06F 16/9535* (2019.01); *G06F 3/0482* (2013.01); *G06F 9/451* (2018.02);
(Continued)

(58) Field of Classification Search
CPC .... G06F 16/9535; G06F 9/451; G06F 16/955; G06F 16/248; G06F 3/0482; G06F 3/04817
(Continued)

(56) References Cited

U.S. PATENT DOCUMENTS 8,468,164 B1 *  6/2013  Paleja ................... G06F 16/24
                                                            707/767
8,881,021 B1    11/2014  Das et al.
(Continued)

FOREIGN PATENT DOCUMENTS

WO        2014110462 A1    7/2014

OTHER PUBLICATIONS

"International Search Report and Written Opinion Issued in PCT Application No. PCT/US2019/061048", dated Mar. 24, 2020, 15 Pages.

*Primary Examiner* — Evan Aspinwall
(74) *Attorney, Agent, or Firm* — NovoTechIP International PLLC

(57) ABSTRACT

A method and system for providing a personalized user interface and personalized search suggestions when using an application is disclosed. The method includes receiving a request for providing a personalized user interface such as a personalized menu for an application and examining a history of the user's usage of the application, a history of other user's usage of the application, and/or the content of the current document in the application, before identifying one or more suggested options offered by the application based on one or more of these factors. A list may then be generated and provided for being displayed as part of the personalized user interface. Upon receiving an indication of a user's intent to perform a search within the application, the user's usage history, usage history of users with similar activities, and/or content of the current document may be (Continued)

examined to provide the user with a list of search suggestions.

19 Claims, 13 Drawing Sheets

(51) Int. Cl.
*G06F 16/955* (2019.01)
*G06F 16/248* (2019.01)
*G06F 3/0482* (2013.01)
*G06F 3/0481* (2013.01)

(52) U.S. Cl.
CPC .......... *G06F 16/248* (2019.01); *G06F 16/955* (2019.01); *G06F 3/04817* (2013.01)

(58) Field of Classification Search
USPC ........................................................ 707/722
See application file for complete search history.

(56) References Cited

U.S. PATENT DOCUMENTS

| | | | |
|---|---|---|---|
| 9,116,600 | B2 | 8/2015 | Gonsalves |
| 9,378,467 | B1* | 6/2016 | Chaiyochlarb ..... G06F 3/04817 |
| 9,671,956 | B2 | 6/2017 | Kritt et al. |
| 9,841,980 | B2 | 12/2017 | Anderson et al. |
| 2014/0324856 | A1* | 10/2014 | Lahiani .............. G06Q 30/0631 |
| | | | 707/736 |
| 2015/0106737 | A1* | 4/2015 | Montoy-Wilson ...... G06F 3/048 |
| | | | 715/745 |
| 2015/0169285 | A1* | 6/2015 | Reyes ..................... G06F 3/167 |
| | | | 715/728 |
| 2016/0132234 | A1* | 5/2016 | Riscutia .................. G06F 3/017 |
| | | | 715/773 |
| 2017/0031575 | A1* | 2/2017 | Dotan-Cohen ..... G06F 3/04847 |
| 2018/0109920 | A1* | 4/2018 | Aggarwal .............. H04L 69/28 |

* cited by examiner

PERSONALIZED USER EXPERIENCE AND SEARCH-BASED RECOMMENDATIONS

TECHNICAL FIELD

This disclosure relates generally to personalizing an application's user experience and, more particularly, to a method and system of providing personalized search results and personalized user interface elements.

BACKGROUND

Many applications provide numerous features for users to utilize when using the application. Because of the sheer number of available features, most users do not have the time or ability to learn about all of these features and how to find and use them. As a result, most users only utilize a small fraction of available features in a given application, even though some of the available features may be very useful for the functions they normally perform or the results they seek to achieve.

Furthermore, some of the available features can be hard to locate and access. Additionally, navigating to the available features may be difficult. This could mean that even when a user is aware of a feature, he/she may have to click through multiple options to arrive at their desired feature. This can be time consuming and inefficient. These factors limit a user's ability to utilize an application effectively and efficiently, as well as limiting their ability to accomplish their desired results.

Hence, there is a need for improved systems and methods for allowing the user to more easily find and access available features in an application.

SUMMARY

In one general aspect, the instant application describes a device for personalizing a user interface. The device may comprise one or more processors and a memory in communication with the processors, where the memory comprises executable instructions that, when executed by the processors cause the device to examine examining a history of a user's usage of an application, examine a history of usage of the application by one or more other users, identify one or more suggested options offered by the application based on the history of the user's usage and the history of the usage of the application by the one or more other users, generate a first list of the one or more suggested options, and provide the list of the one or more suggested options for being displayed as part of the personalized user interface.

In another general aspect, the instructions may further cause the processors to cause the device to identify one or more recently used activities of the user, identify one or more other suggested options offered by the application based on at least one of the history of the user's usage of the application, the one or more recently used activities, the history of usage of the application by the one or more other users, or the one or more suggested options, generate a second list of the one or more second suggested options, and provide the second list of the one or more second suggested options for being displayed as part of the personalized user interface In yet another general aspect, the instant application describes a method for providing a personalized user interface for an application. The method may comprise examining a history of a user's usage of the application, examining a history of usage of the application by one or more other users, identifying one or more first suggested options offered by the application based on the history of the user's usage and the history of the usage of the application by the one or more other users, generating a first list of the one or more first suggested options, and providing the first list of the one or more first suggested options for being displayed as part of the personalized user interface.

In another general aspect, the method may further comprise identifying one or more other suggested options offered by the application based on at least one of the history of the user's usage of the application, the one or more recently used activities, the history of usage of the application by the one or more other users, or the one or more suggested options, generating a second list of the one or more second suggested options, and providing the second list of the one or more second suggested options for being displayed as part of the personalized user interface.

In one other general aspect, the instant application describes another device for personalizing a user interface. The device may comprise one or more processors and a memory in communication with the processors, where the memory comprises executable instructions that, when executed by the processors cause the device to examine a history of a user's usage of an application, identify one or more first search suggestions based on the history of the user's usage, generate a list of the one or more search suggestions, and provide the list of the one or more search suggestions for being displayed to the user for selection as part of the user's search within the application.

In another general aspect, the instructions may further cause the processors to cause the device to identify one or more recently used activities of the user, examine a history of searches conducted in the application by one or more other users of the application, identify one or more other search suggestions based on at least one of the one or more recently used activities or the history of searches conducted in the application by the one or more other users of the application, generate another list of the one or more search suggestions, provide the other list of the one or more search suggestions for being displayed to the user for selection as part of the user's search within the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

This description is related to techniques used for personalizing features and options presented to a user and personalizing results of searches conducted by the user when utilizing an application. To do so, the solution examines the user's command history and determines based on those commands and a number of other factors, including but not limited to commands used by other users with similar command histories, features that may be most useful to the user, content of the current document, selections made by the user in the current document, and any elements of the document the user has interacted with in the past. These features may be presented to the user in several different ways. For example, the features may be divided into two or more sections, one presenting the features most often used previously by the user and another presenting the features determined to be most useful to the user based on the user's command history. The personalized features may also be presented to the user in the form of search results or suggested search terms, when the user attempts to conduct a search within the application. As a result, the solution ensures that a user is aware of and can easily access features and search results most applicable to the user.

As will be understood by persons of skill in the art upon reading this disclosure, benefits and advantages provided by such implementations can include, but are not limited to, a solution to the technical problems of inefficient use of features and commands available in applications. Technical solutions and implementations provided here optimize access to and utilization of features and commands available in any given application. The benefits provided by these solutions provide more user-friendly applications and enable users to increase their efficiency and proficiency of various applications.

Figure 1A:
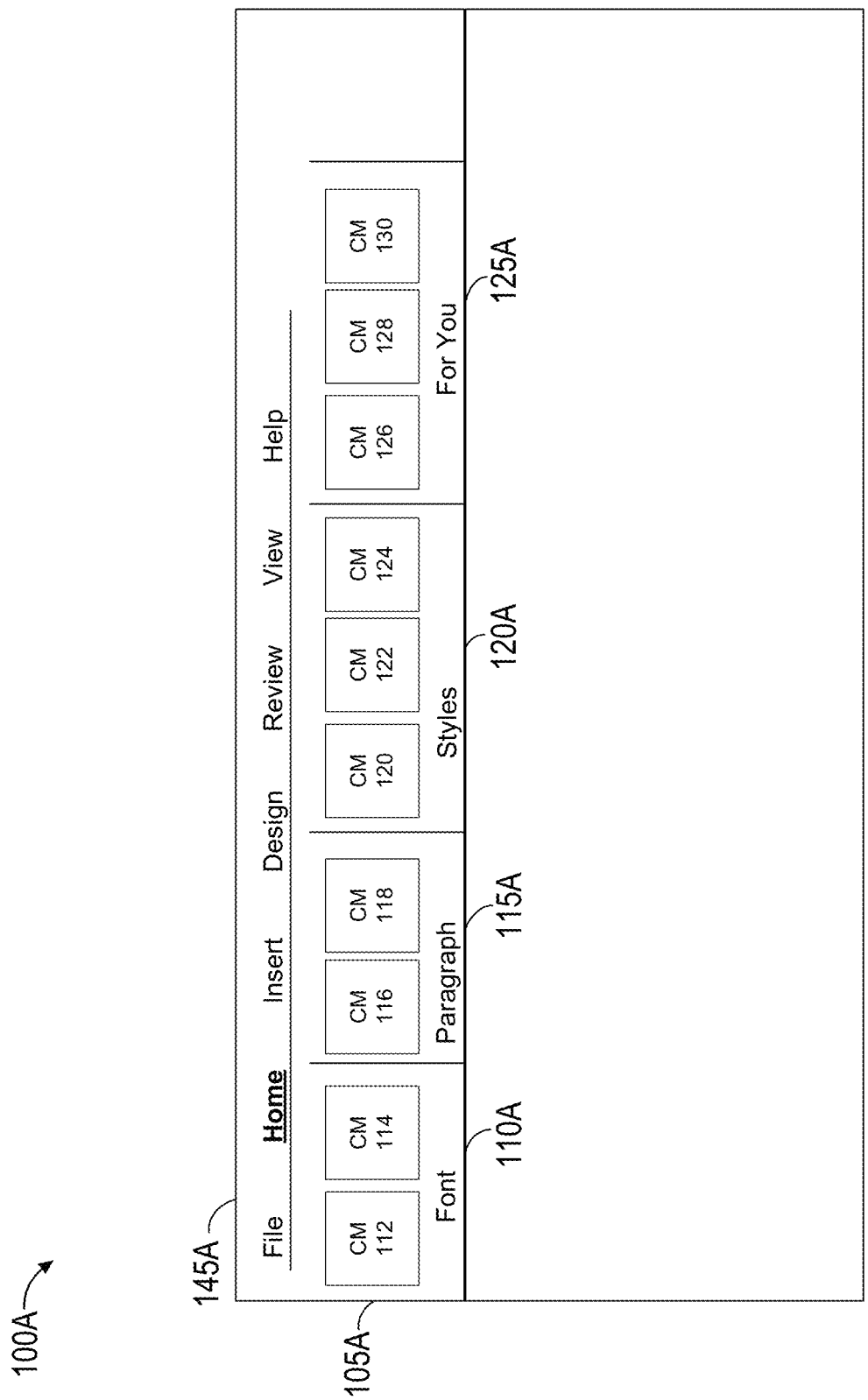
FIGS. 1A-1C illustrate example graphical user interface (GUI) screens for displaying a toolbar menu which presents personalized commands and task options to a user of an application.

Referring now to the drawings, FIG. 1A illustrates an example GUI screen 100A displaying a toolbar menu 105A for presenting personalized command and task options to a user of an application. Although, shown at the top of the GUI screen 100A, the toolbar menu 105A may be displayed at the bottom, on the left, on the right side of or anywhere else in the screen 100A. The toolbar menu 105A may include a list of selectable tabs 145A under each of which various command options of the applications may be presented to the user. For example, the list of selectable tabs 145A may include a File tab, a Home tab, an Insert tab, a Design tab, a Review tab, a View tab, and a Help tab. The selectable tabs 145A may be used to organize the various command and task options of the application into separate categories for easier access. For example, all command options related to inserting an item into an editable portion of the screen 100A may be categorized under the selectable tab "Insert." This may enable a user to find applicable and desired commands faster and easier. However, because of the large number of commands available in certain applications, it may still take the user a considerable amount of time to find and/or access a desired command. For example, the user may have to make an assumption as to under which category a command falls, click on the tab that seems related to that category and look through all the commands available under that tab to locate the desired command.

To address these problems, the method for personalizing features presented to a user of an application may make use of a default tab of the toolbar menu 105A. The default tab may be a tab designated by the program as one selected by default by the application. The default tab may be presented to the user when the user first opens the application and/or a file utilizing the application, and may contain a list of commands determined to be most useful to the user by the application. For example, a default tab of a word processing application may include options for changing the type and size of the font, changing paragraph alignments, numbering items, changing paragraph indentations, and the like. In one implementation, such as the one shown in screen 100A, the default tab may be labeled "Home."

Once one of the tabs of the selectable tabs 145A are selected, the chosen tab may be highlighted and/or underlined to distinguish it from the other tabs and all commands that have been designated by the application as falling under the selected tab may be displayed in the toolbar menu 105A. For example, once the "Home" tab is selected (or the application is first opened) in the toolbar menu 105A, commands 112, 114, 116, 118, 120, 122, 124, 126, 128 and 130 (CM 112-130) are displayed. In one implementation, to further organize the commands, they are divided into separate categories and presented accordingly under each tab. For example, CM 112 and CM 114 which relate to font are displayed in a font 110A portion of the toolbar menu 105A. Similarly, CM 116 and CM 118 which are directed to paragraph formatting are displayed in a paragraph 115A portion, and CM 120, CM 122 and CM 124 which are related to styles are shown in a styles 120A portion of the toolbar menu 105A. Each of the portions 110A, 115A and 120A may be a region of the GUI designated for displaying particular icons or any other type of links to various options in the toolbar menu 105A.

To provide personalization and easier access to commands most relevant to each user, the toolbar menu 105A also includes a "For You" portion under the Home tab. In one implementation, commands shown in this portion are those most used by the user. This may be done automatically without user input. To achieve this, the application may keep track of commands utilized by the user and/or other users over a specific time period and may add an icon to the For You section of the toolbar menu for any commands that are used more often than a predetermined number of times during the specific time period. The specific time period and the predetermined number of times may be preset or may be changeable depending on various factors. The various factors may include, for example, the frequency of use of the application by the user and/or other users. For example, the period of time may be set to 10 days for a user that utilizes the application everyday and 60 days for a user that only utilizes the application once every few days. Alternatively, the period of time may be set based on the length of time the application is used. Furthermore, the predetermined number of times may depend on the user's frequency of use. For example, for a frequent user the number may be 20, while for an occasional user the number may be 10. Various other factors may be taken into account in determining which icons should be presented in the For You section of the toolbar menu 105A.

In one implementation, the application may display a preselected number of icons or any other type of links to commands most often used during a preceding calendar time period or during a designated time period of use. For example, four icons may be displayed for four commands most often used during the previous 30 days or four commands used during the previous 20 hours of use of the application.

In an alternative implementation, instead of automatically adding the icons for most frequently used commands, the application may allow the user to decide whether or not the icon should be added. For example, once a command is identified as a frequently used command, the application may present the user with a choice as to whether they desire to add an icon for the command to the For You section. In yet another implementation, the user may be able to add or remove icons from the For You section when desired.

Figure 1B:
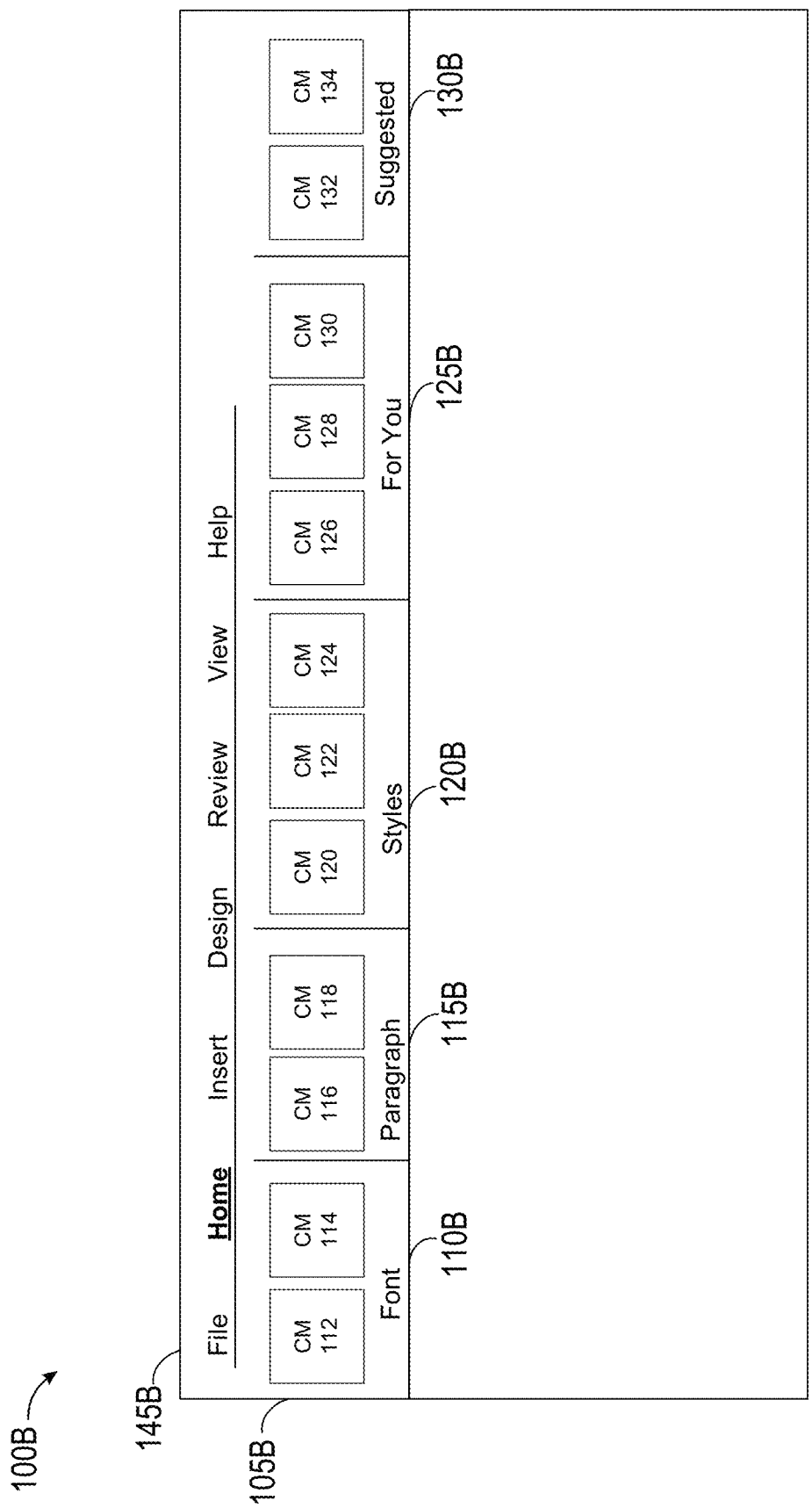

FIG. 1B illustrates an example GUI screen 100B displaying an alternative toolbar menu 105B for presenting various command options to a user of an application. Similar to the toolbar menu 105A, the toolbar menu 105B includes a list of selectable tabs 145B with the list including a Home tab for presenting most frequently used command options to the user. Upon selecting the Home tab, the toolbar menu 105B displays a font portion 110B for presenting CM 112 and CM 114, a paragraph portion 115B for presenting CM 116 and CM 118, a styles portion 120B for presenting CM 120, CM 122 and CM 124, and a For You portion 125B for presenting most frequently used commands CM 126, CM 128 and CM 130.

Furthermore, the toolbar menu 105B also displays a suggested portion 130B for presenting CM 132 and CM 134 which may be icons or other types of links to commands suggested by the application based on the user and/or other user's history of activities in the application. The history of activities may include long-term history of the user's activities (i.e., actions the user has taken in the past), as well as actions the user has taken in the current session or is currently taking in the application. As a result, the suggested portion 130B may be updated regularly based on actions the user takes in the application. For example, as the user switches from editing a table to formatting an image, the icons displayed in the suggested portion 130B may change to correspond to the user's current task. The suggested commands may be selected such that they enable the user to accomplish their tasks more efficiently. This may be done by examining the user and other users' usage history and currently activity to identify the current task and/or frequently used commands and then find other commands that are most closely related to the current task or to those frequently used commands. For example, if one of the user's most frequently performed activities has been to insert a table into a word processing document, the application may determine that table styles is most closely related to inserting tables and present an icon for that command to the user in the Suggested portion 130B. The relationships between various commands may be based on internal algorithms and models that link different commands and/or based on information from other users. For example, the application may examine data from other users with similar past activities and command usage to determine what commands they used in conjunctions with the user's frequently used commands or current task. This information may be used as one of the factors in deciding which commands to suggest to the user.

The data consulted may be from users within the same organization (e.g., same local network, same tenancy, etc.) or from users across multiple organizations. In one implementation, the system may identify users with similar application uses and/or similar roles or work functions within an organization or across multiple organizations and decide to use the history data of such similar users. In one implementation, the system may determine if similar users exist within the same organization and look outside of the organization when it cannot find a sufficient number of similar users within the organization. It should be noted that even though, data from users across multiple organizations may be used, the content of the data is anonymous and can in no way be traced back to the original user and/or organization. This guarantees the users' privacy, while enabling the method to utilize other users' data for the benefits of one another.

The icons in the suggested portion 130B may updated periodically based on a preset schedule or based on a change of models, or may be updated as the user works in the application. For example, the icons may be updated based on the user's current command usage. This may mean, for example, that when a user inserts a table in a document, the application may update the suggested list to include options for formatting a table (e.g., suggested commands such as insert a row, delete a row, or table styles).

The number of icons presented to the user in the Suggested portion 130B may be preset or changeable (e.g., the number of icons may adapt itself). For example, the number may depend on the number of frequently used commands by the user or other users. In one implementation, the user may have the option of removing an icon from the Suggested portion 130B. Upon removal, the application may present a next suggested command in place of the icon removed. The order of priority may be determined based on a number of factors, such as close relationships between frequently used commands and related ones, the likelihood of use based on the user's and/or other user's past history, and the like.

Figure 1C:
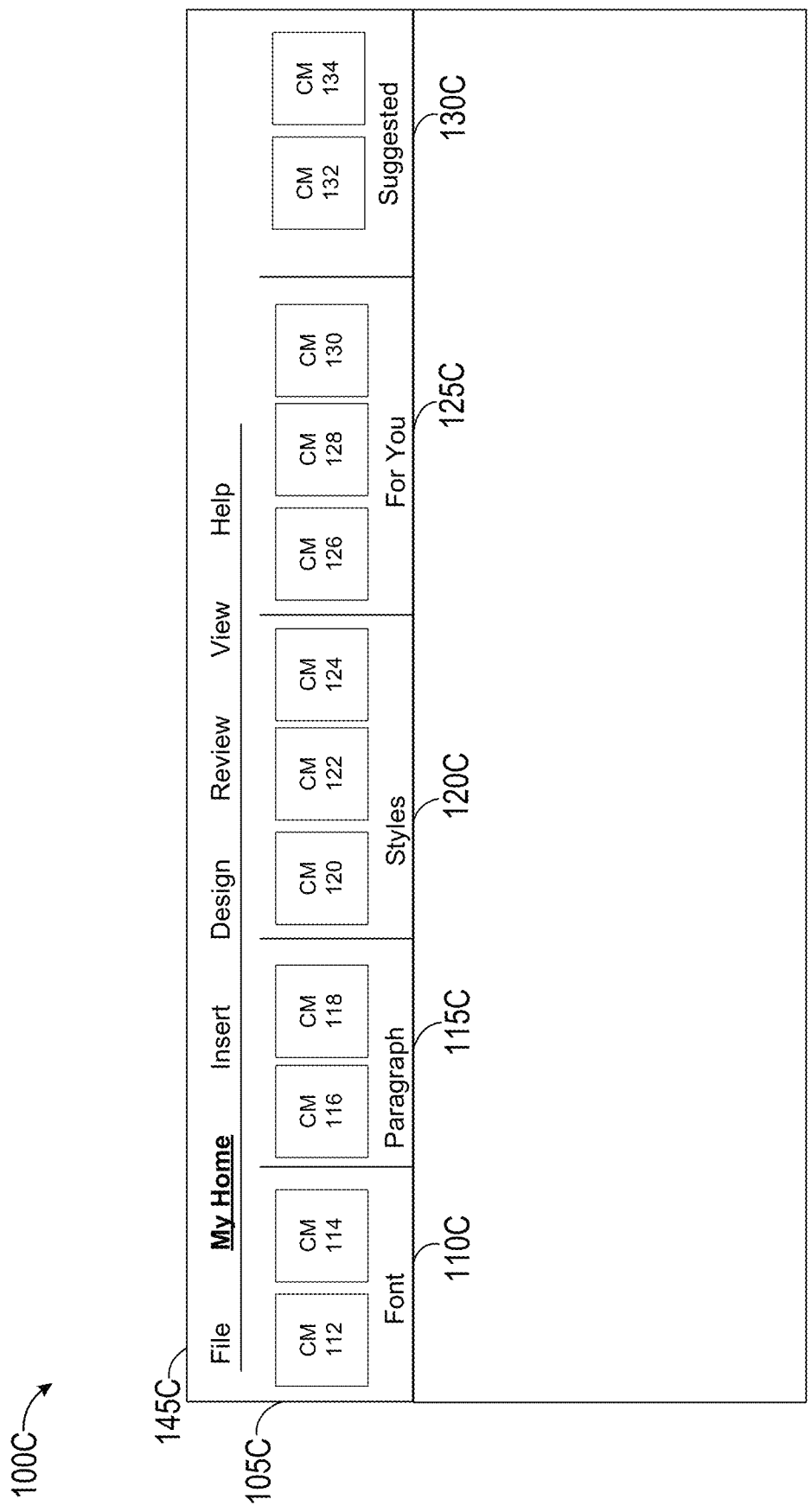

FIG. 1C illustrates an example GUI screen 100C for displaying an alternative toolbar menu 105C for presenting a fully personalized command menu. Similar to the toolbar menus 105A and 105B, the toolbar menu 105C includes a list of selectable tabs 145C. However, instead of the Home tab, the list of selectable tables 145C includes a default tab labeled My Home for presenting a fully personalized command interface to the user. Upon selecting the Home tab, the toolbar menu 105C displays a font portion 110C for presenting CM 112 and CM 114, a paragraph portion 115C for presenting CM 116 and CM 118, a styles portion 120C for presenting CM 120, CM 122 and CM 124, a For You portion 125C for presenting most frequently used commands CM 126, CM 128 and CM 130, and a Suggested portion 130C for presenting suggested commands CM 132 and CM 134. In one implementation, having a fully personalized command menu may mean that the icons for each of the commands CM 112-CM 134 may be preset to options most frequently used by the user. For example, the CM 112 icon may display a font type most frequently used by the user and the CM 114 may display a font size most frequently used by the user. Alternatively, each icon may include a drop-down menu which when selected displays a list of most frequently used settings for that command.

Figure 2A:
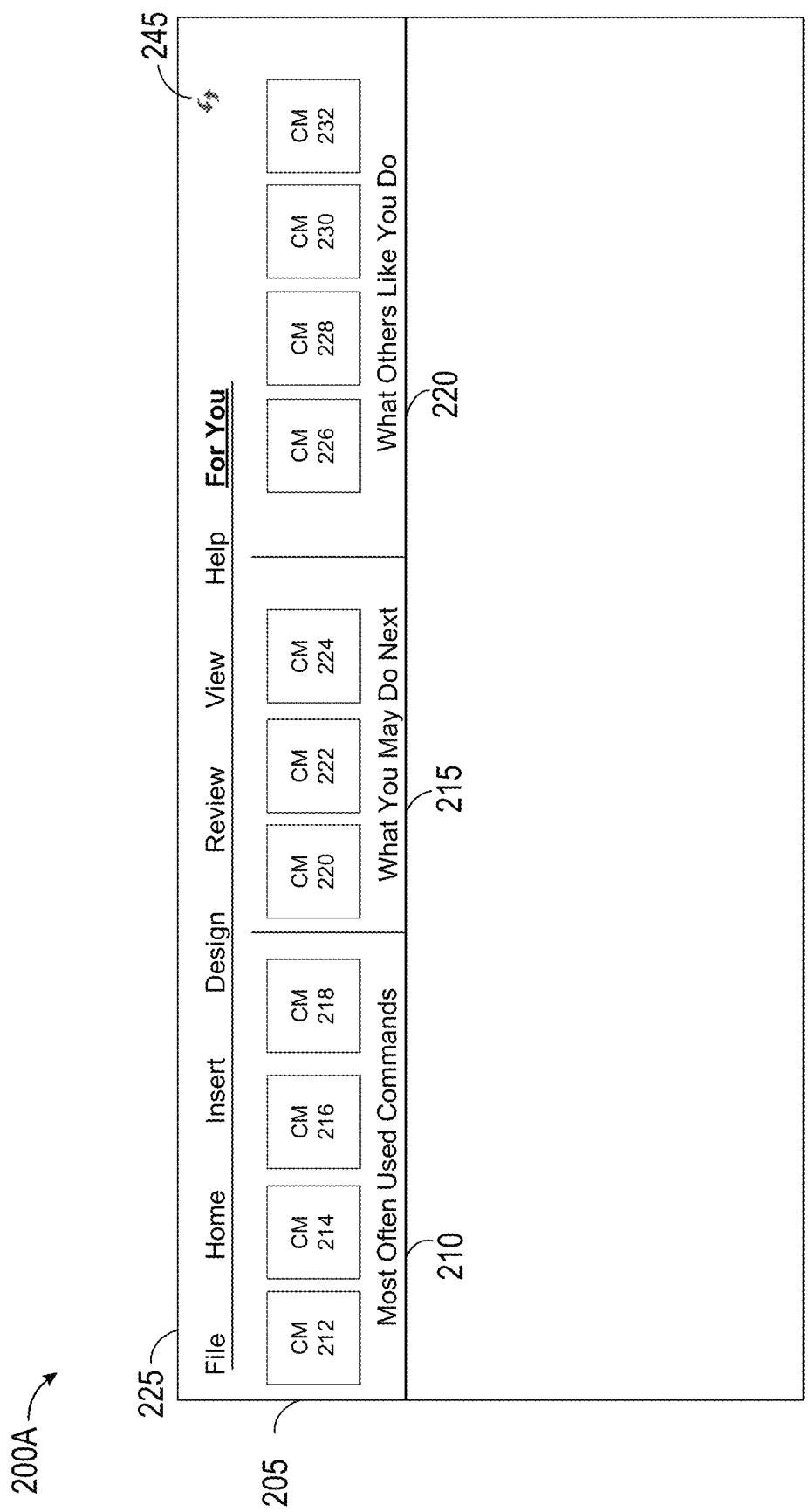
FIGS. 2A-2B illustrate example GUI screens for displaying a personalized tab in a toolbar menu which presents personalized commands and task options to a user of an application.

FIG. 2A illustrates an example GUI screen 200A for displaying a personalized tab in a toolbar menu 205 for presenting various command options to a user of an application. The toolbar menu 205 includes a list of selectable tabs 225 which include an alternative and/or additional fully personalized tab labeled For You. Upon selecting the For You tab, the toolbar menu 205 may display a portion 210 for presenting CM 212, CM 214, CM 216 and CM 218, a portion 215 for presenting CM 220, CM 222, and CM 224, and a portion 220 for presenting CM 226, CM 228, CM 230 and CM 232.

CM 212, CM 214, CM 216 and CM 218, which are displayed in the portion 210 may be icons for most frequently used commands of the user and/or other users. These icons may be similar to those discussed above with respect to the For You portions 125A-125C of FIGS. 1A-1C and may be identified in a similar manner. For example, the application may examine a stored list of commands used previously by the user during a specific recent time period to identify those commands most often used. The number of command icons displayed in the portion 210 may be preset or may depend on various factors such as, the size of the remaining portions of the toolbar 205 (e.g., portions 215 and 220), the number of most frequently used commands found, and the like.

It should be noted that the portions 210, 215 and 220 may be configured such that they are aware of and complement each other. For example, if one or more commands are suggested in the portion 215, the portions 210 and 220 would not include those same commands. This may prevent redundancy and allow each portion to focus on a specific set of commands. In one implementation, to achieve this, the machine-learning models used to provide the command suggestions in each portion are trained simultaneously and as such may benefit from each other's results.

Command icons CM 220, CM 222, and CM 224, which are displayed in the portion 215 of the toolbar 205 may be for commands that the user can utilize next. These may be identified by examining the user and/or other users' prior history and/or any other information linking various commands with each other. This may include examining the user command histories to determine what commands the users normally use after the ones recently used. For example, if during the current session the user has inserted a picture, the application may search the and/or other users' command history to determine what actions the user or other users have taken in the past after inserting a picture.

It should be noted that the user's prior history is not limited to usage history within the present application session and can span across multiple sessions. In one implementation, the usage history may include the entirety of the user's history of use of the application. Alternatively, the usage history may include the history for a specific period of time. Furthermore, usage history may include the history of other users. For example, it may include the history of other users with similar activities, similar work functions and/or similar work products. To enable examining the usage history outside of a current session, users' histories of activities may be stored in a database. In one implementation, the database may be stored in the cloud. As such, the history may be available even if the user uses the application on a different device. As long as the user is logged into or otherwise known to the application using a unique identification code, the history information may be accessed and used to personalize the application. Usage history may also be stored locally on the user's device. This may enable the command suggestions to also be personalized based on the specific device used. The device specific information may be useful in instances where the user performs different functions on different devices. In such cases, storing the user's history on each device separately may allow the method to provide personalized recommendations on each device.

Referring back to the portion 215 of toolbar 205, upon examination, the application may determine that the most frequently used command after inserting a picture has been to format the picture. In that case, the application may add picture formatting to the list of commands the user may utilize next. If the application cannot identify any commands frequently used after inserting a picture, or in some cases even if the application does identify such commands, the application may examine a database containing information about command associations to identify a command associated with inserting a picture.

The list of commands the user may use next may be updated periodically based on a preset or changeable schedule. Furthermore, the list may be updated any time the user selects the For You tab, after visiting a different tab. Still further, the list may be updated when the user clicks on the refresh button 245. The list of commands may also be updated based on a signal that indicates the user is switching tasks. For example, the list of commands may be updated when the application determines that the user is now working on a table after formatting a picture.

Command icons CM 226, CM 228, CM 230 and CM 232, which are displayed in the portion 220 of the toolbar 205 may be for suggested commands based on other users' activities. Similar to the commands in the portion 215, these may be identified by first examining the user's command history to identify the commands most recently used by the user. The application may then consult a global database of user command history to identify the actions that are normally taken by other users after performing similar commands. In one implementation, in consulting the global database, the method identifies and uses data for users that are in some way similar to the current user. For example, the method may use history data from users with similar activities, similar work functions and/or similar work products. The database consulted may be global but also local to the current device. The list of command icons in the portion 220 may be updated in a similar manner as those in the portions 210 and/or 215.

Figure 2B:
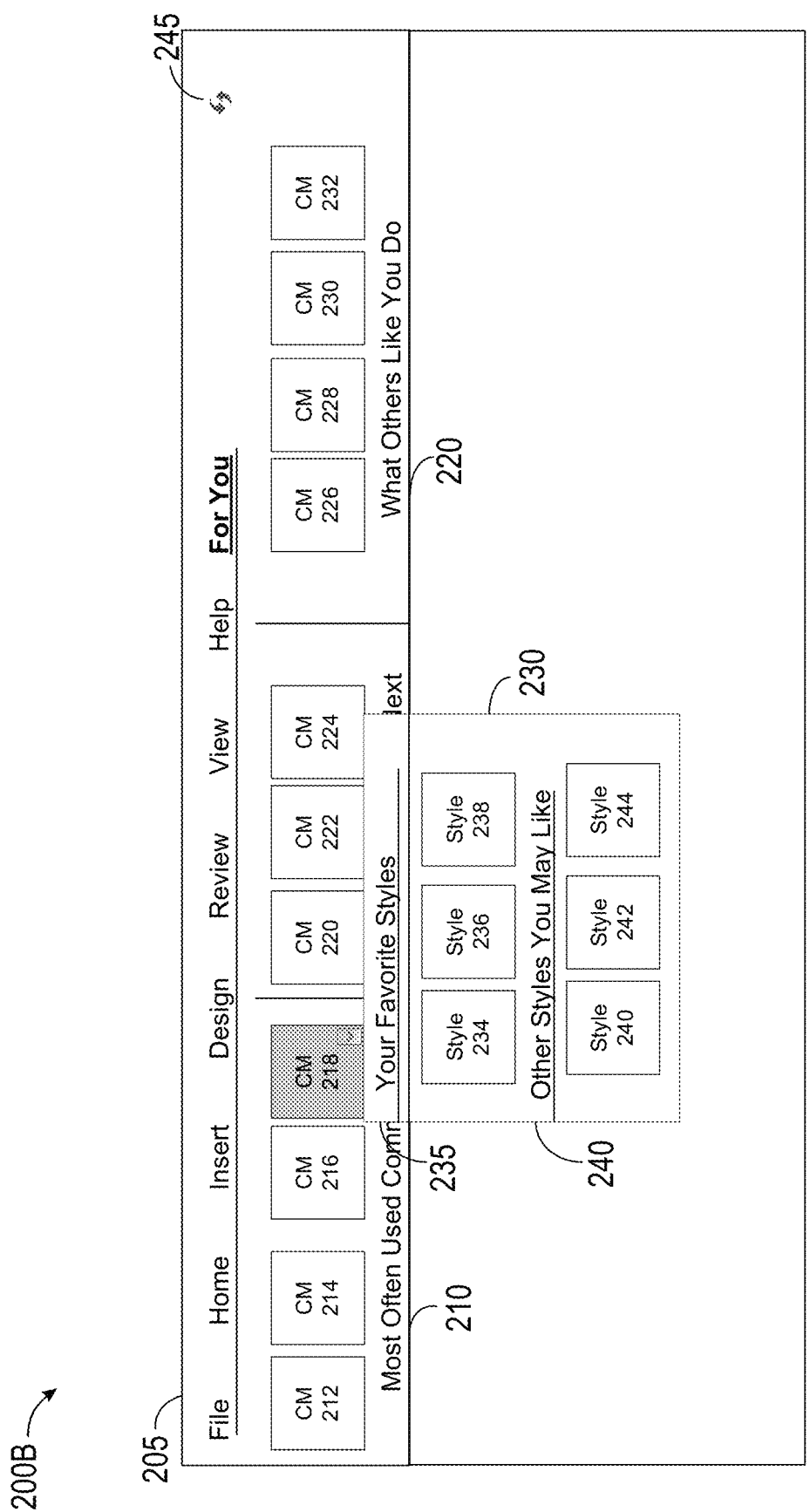

FIG. 2B illustrates an example graphical user interface (GUI) screen 200B displaying the personalized toolbar menu 205 for presenting various command options to a user of an application. The screen 200B also depicts how one or more commands in the toolbar 205 may be personalized for the user. Some commands in the toolbar 205 may include additional options the user can choose from once selecting the command. For example, CM 218 includes a drop-down menu for displaying a list of options the user may choose from when selecting the command. These options are displayed in the drop-down menu 230 for CM 218. To personalize the commands, the options may be customized for each user based on the user's activities, user's command history, content of the current or past documents (e.g., styles or colors within the current or past documents of the user) and/or based on other factors such as what other similar users normally use. For CM 218, the options are divided into two sections, one section 235 for displaying the user's favorite styles and another section 240 for displaying other styles the user may like. The favorite styles may be chosen based on the user's prior selected styles, while the suggested styles in the section 240 may be chosen based on what other users with similar interests and command histories have chosen. This provides an additional level of personalization to help the users to efficiently navigate the application and learn about options they may not be aware of.

In addition to personalizing a toolbar menu, the method of personalizing options presented to a user of an application may also include personalizing any other type of menu used for presenting options to the user or any other portion of a user interface in an application or program. For example, the method may be used to personalize a context menu or a floating menu, as shown in FIGS. 3 and 4.

Figure 3:
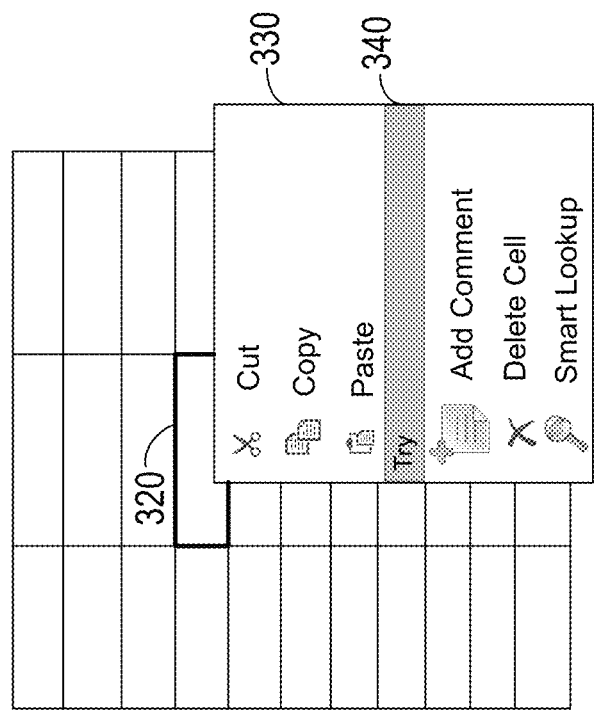
FIG. 3 is an example GUI screen for displaying a personalized context menu for presenting personalized commands and task options to a user of an application.
Figure 4:
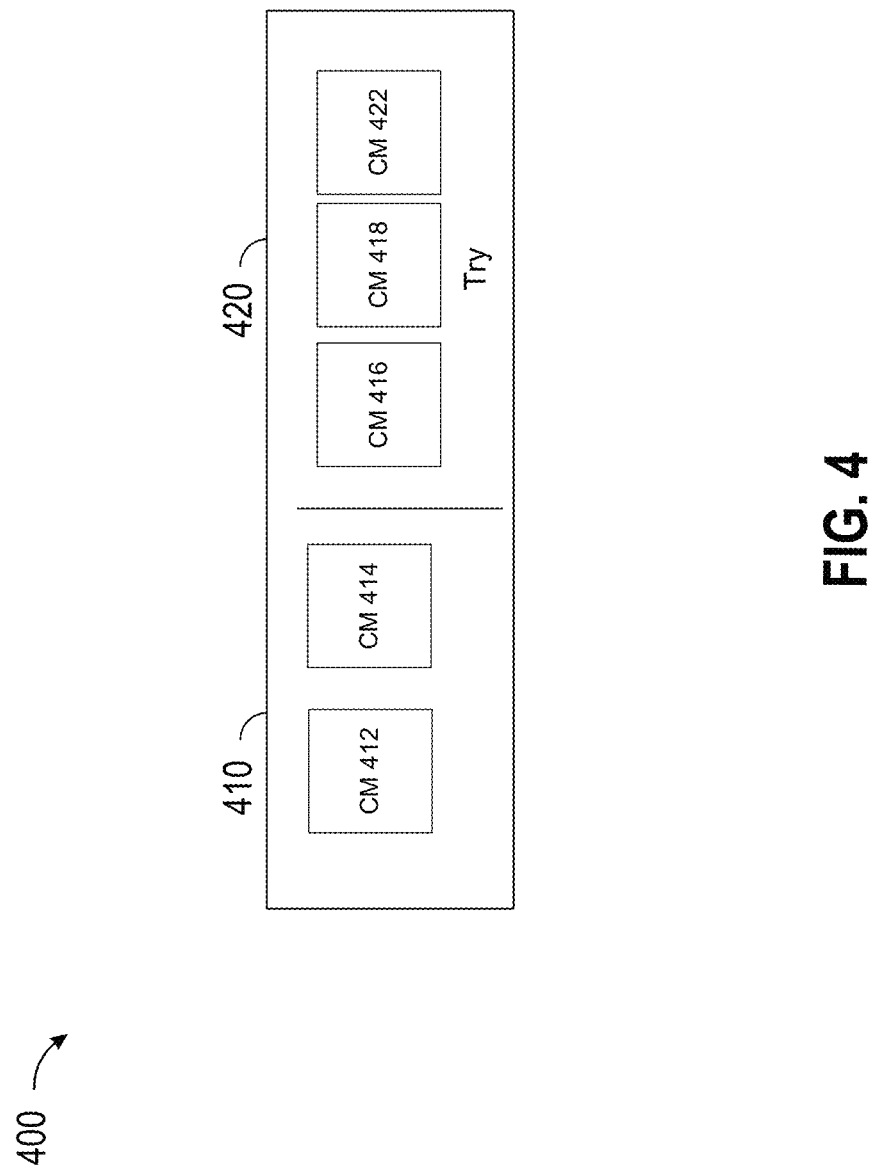
FIG. 4 is an example GUI screen for displaying a personalized floating menu for presenting personalized command and task options to a user of an application.

FIG. 3 illustrates an example GUI screen 300 for displaying a personalized cell context menu 330 for presenting various command options to a user of an application. A context menu may refer to any menu in a GUI that appears upon a user-initiated selection, such as a right-click mouse operation, to display a limited set of options that are available in the current context of the application. The available options may be for commands that are related to a selected object.

The GUI screen 300 illustrates an example spreadsheet 310 for which a personalized cell context menu can be generated and displayed. The spreadsheet 310 includes multiple cells that can be used for organization, analysis and storage of data in tabular form. One of the options available during use of the spreadsheet application may be to select one or more cells from among the cells available in the spreadsheet. Once a cell, such as cell 320 is selected, the user may initiate display of the cell context menu 330 by for example, a right click mouse operation. In addition to the icons normally displayed in a context menu, the cell context menu 330 may also include a personalized section 340 for displaying options that are tailored to the user. These may be determined based on the user's activity history, may be suggestions based on activities of other users, or may be based on a combination of both. The suggestions may also be identified based on a number of other factors relevant to the particular application and the commands available for the selected object. For example, the suggestions may be determined based in part on the content of the selected cell or the rest of the document.

In one implementation, in addition to identifying suggested options, the application may also determine an order a priority for the identified options based upon which the options may be displayed. The order of priority may depend on a number of factors such as, the degree of useful and/or probability of use.

FIG. 4 illustrates an example personalized floating menu 400 for presenting personalized command options to a user of an application in a floating menu. A floating menu (also referred to as a hovering menu) may refer to a menu in a GUI that stays in a fixed position when the user scrolls the page. The floating menu may appear to float on top of the screen as the user scrolls to display a limited number of options that are available for the current state of the application. Similar to the toolbar menu and context menu, the floating menu 400 may be personalized to present not only the options it normally presents, but also options that are personalized based on the user's current activity, the user's activity history, other users' activity histories and/or the selected content or contents of the entire document.

Accordingly, the floating menu 400 includes a portion 410 for displaying icons normally shown in a floating menu for the application and a portion 420 for displaying personalized icons. The portion 420 may include icons for commands that are identified by the application as relating to the user's specific activities or based on the user's history of command use and activity. These may be identified and displayed in a similar manner as that described above with respect to the personalized toolbar menu and personalized context menu. Thus, CM 416, CM 418, CM 422 may be for commands that are identified to personally relate to the user's use of the application. CM 412 and CM 414, on the other hand, may be for commands normally shown as part of a floating menu for the application.

Figure 5:
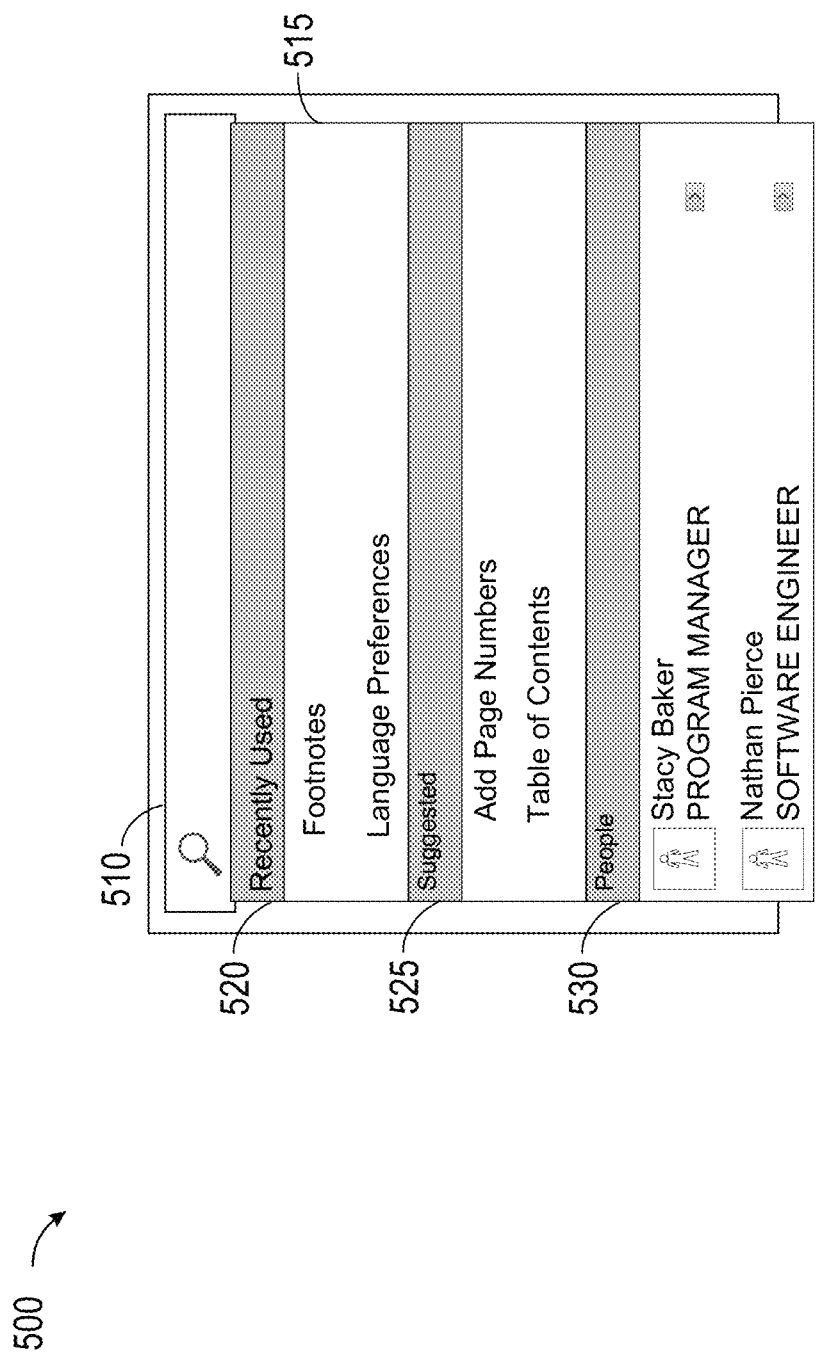
FIG. 5 is an example GUI screen for displaying personalized search suggestions for conducting searches.

FIG. 5 illustrates an example GUI screen 500 for displaying a personalized search box 510 for conducting searches within an application. In addition to providing various command applications and activities, some applications offer a search option that enables users of the application to perform a search within the application. The search option may be provided to enable the user to search for desired commands, to find out how to perform specific tasks, to search for people, documents or to obtain any other available information about the application to accomplish their tasks.

In one implementation, when a user first clicks into the search box 510, they may be presented with an expanded box 515 for displaying some suggestions even before they type any characters into the search box 510. The suggestions in the expanded box 515 may be divided into different sections based on, for example, the utilities of the application. In one implementation, the suggestions may be divided into a recently used set 520, suggested set 525 and people 550.

The list of suggestions may be generated using machine learning, as discussed further below, and may be related to the task the user is currently performing in the application. For example, the recently used set 520 may be generated based on recently used commands or activities of the user within the application and may take into account terms other users with similar activities have used to conduct searches. For example, when a user clicks on the search box 510 after working on a particular task, the recently used set 520 may display commands that people have searched for when they were performing that task. In one implementation, the suggested set 525 may display terms for related tasks that other people have used while performing the same task or tasks the user has used in the past in conjunction with the task recently performed. In one implementation, to personalize command suggestions when conducting a search, the application may take into account the user's whole command usage history and/or the contents of the current document and recommend personalized suggestions accordingly.

In addition to presenting the list of suggestions in the expanded box 515, when the user first clicks on the search box 510, the method for performing personalized searches may also update the suggestions provided in the search box 510 as the user begins entering characters in the search box 510. This may involve refining the suggested search items based on a number of factors such as, what other people conducting similar searches have searched for and/or keywords available for commands relating to the characters already entered and relating to task(s) recently performed by the user. This process may involve the use of a prediction engine which also relies on a dictionary to predict the command the user intends to search for as the characters are being typed into the search box 510.

It should be noted that for all of the instances discussed above, in which a user interface is personalized, the personalization may be conducted based on one or more of the user long-term activity history, the user's short-term activity history, current and other document's content, as well as similar usage and content data extracted from other users like them or part of the same organization.

Figure 6:
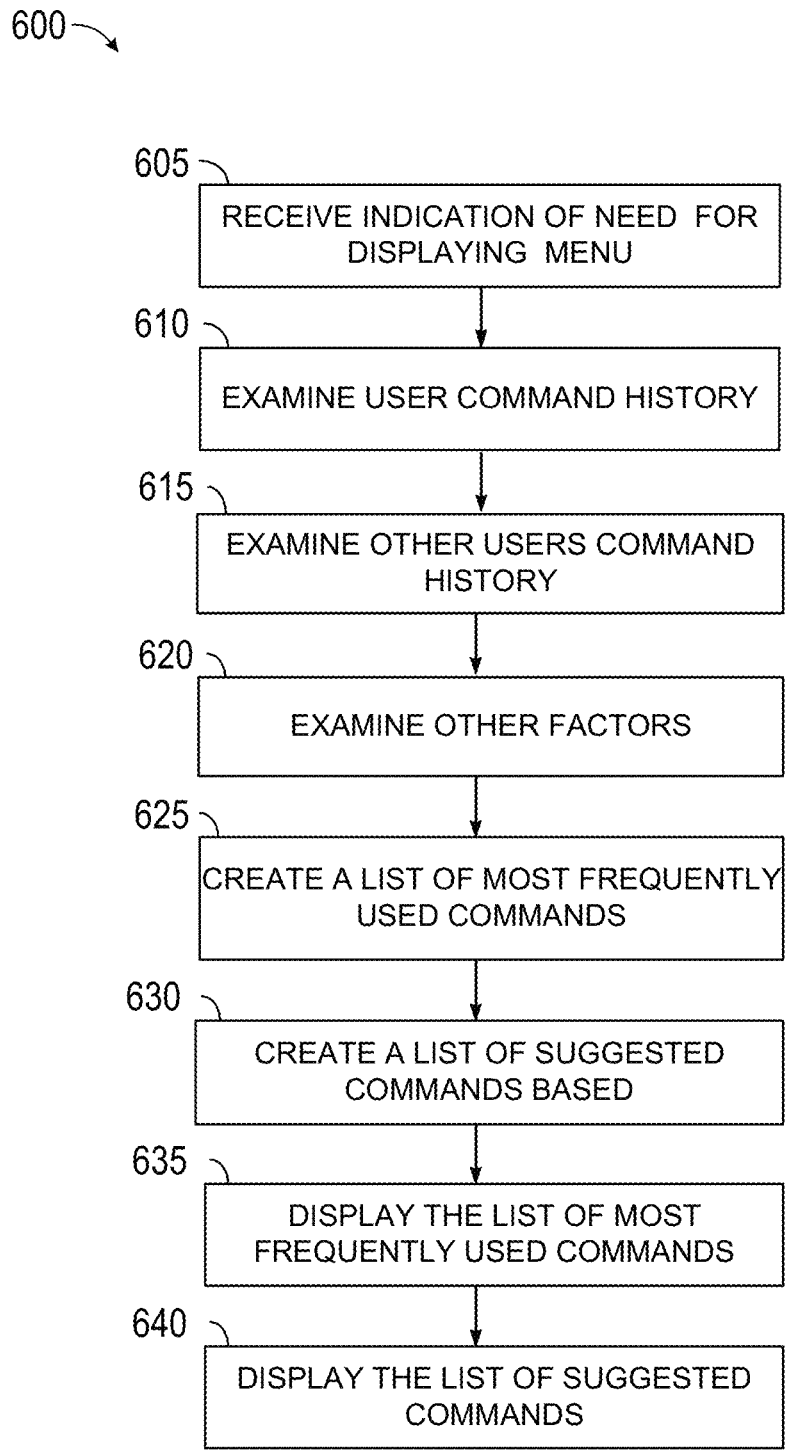
FIG. 6 is a flow diagram depicting an exemplary method for providing a personalized menu in a GUI screen.

FIG. 6 is a flow diagram depicting an exemplary method 600 for providing a personalized user interface in a GUI screen for an application. At 605, the method 600 begins, at 605, by receiving an indication that a menu should be displayed. This may occur, for example, when the application is first opened, when a file utilizing the application is first opened, when the user selects a customizable tab in a menu that is already displayed, when the application receives a request for refreshing a customizable menu, when a request for displaying a menu such as a context menu or a floating menu is received by the application, or when it is determine that the user has switched tasks or is likely to switch tasks (e.g., when a model running in the background predicts that the user is likely to switch tasks). Other instances in which an indication of a need for displaying a menu is received are also possible.

After receiving the indication, method 600 may proceed to examine the user's command and task history, at 610, to identify patterns in the user's usage. The history may be limited to the user's recent history (i.e., during a specific recent time period or during the current session) or may be for the entirety of the user's use of the application. This information may be stored locally and/or in the cloud. In one implementation, the history data may be stored locally temporarily and then transmitted in batches to a data store in the cloud which may store each user's data separately for an extended period of time or as long as the user continues using the application.

Once the user's command and/or task history is examined, method 600 may proceed to examine other users' command and activity histories, at 620. This may be limited to users that are in some way similar to the current user, as discussed above. In addition to examining the current user and other users' history, method 600 may also examine other relevant factors, at 620. These factors may include the current document's selected or entire content, the content that was selected before, user specific information such as proficiency, location, field of work, job time, and the like, and any other metadata (e.g., time of day, day of week, day of month, etc.).

After examining all relevant factors, the application may create a list of most frequently used commands by the user, at 625. This list may be generated in a similar manner as that discussed above and may include utilizing artificial intelligence models that are trained based on the user and/or other user's past usage history, past command clicks, and/or other past activities and/or any other factors discussed above. After creating the list of most frequently used commands, method 600 may proceed to generate a list of suggested commands for the user based on a number of factors including the user and/or other users' usage histories, at 630.

In one implementation, examining other users' past usage history and creating a list of suggested commands based on that history may be done in conjunction with examining the user's usage history and creating the list of most frequently used commands. This can be achieved by utilizing two or more different types of models. One type could be a personal model which is trained based on each user's personal information and another could be a global model that is trained based on examination of a global set of other users' information. A hybrid model may be used to examine users similar to the current user and to generate results based on activities that other users utilizing similar commands as the current user use. For example, it may examine users that create similar artifacts as the current user or utilize the same or similar commands. This may be used to create a list of suggested commands to use next based on the user's current activity. A different type of model may also be used that is trained based on the relationship between different commands and tasks. For example, this model may examine different commands to predict long-term command usage (most often used commands), predict short-term command usage (commands relating to the currently used command), and/or suggest new commands that provide new functionality or provide a better way of doing things. Any of the models may store what is suggested and record how the user interacts with the suggestions (e.g., which suggestions they use). This ensures that every time a user interacts with the system, the models learn from the interaction to make the suggestions better. The different models may be made aware of each other, so that they each benefit from what the other models are predicting, while focusing on a specific aspect of the prediction task.

It should be noted that the models examining the user's data and generating the lists of suggested commands may be hosted locally on the client or remotely in the cloud. In one implementation, some models are hosted locally, while others are stored in the cloud. This enables the client to provide some personalization even when the client is not connected to a network. For example, the client may be able to provide a list of most frequently used user commands (based on frequency and context), but it may not be able to provide suggestions for what other users like you utilize. Once the client connects the network, however, the application may be able to provide better and more complete recommendations and personalization.

Once the lists are generated, the application may display the list of most frequently used commands, at 635, and display the list of suggested commands, at 640. The list of suggested commands may be divided into two section, one for displaying what other users use and one for suggestions on what to do next. The lists may be displayed as part of a toolbar menu, a context menu, a floating menu, or any other type of menu used for an application to display potential commands and tasks.

Figure 7:
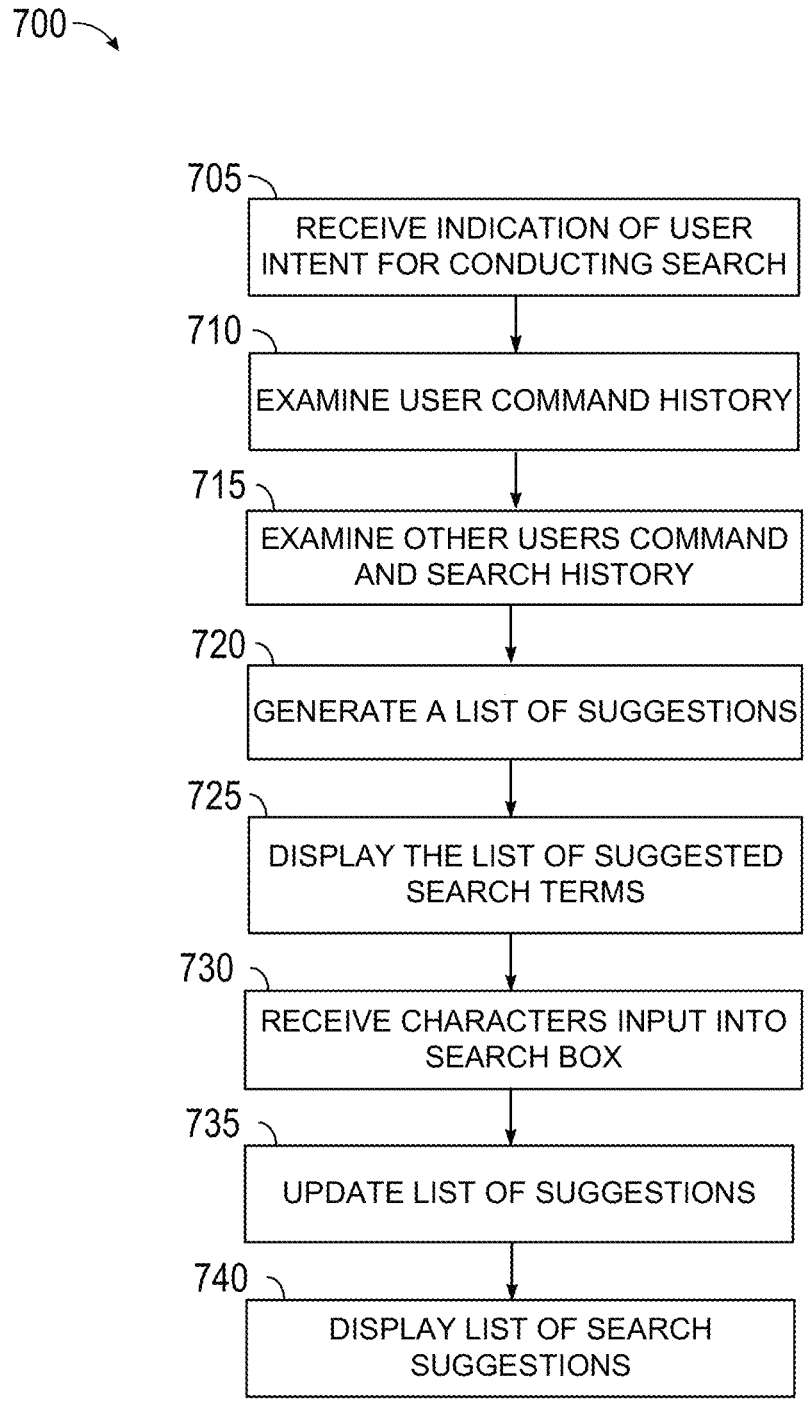
FIG. 7 is a flow diagram depicting an exemplary method for providing personalized search suggestions in a GUI screen.

FIG. 7 is a flow diagram depicting an exemplary method 700 for providing personalized search suggestions in a GUI screen for an application. At 705, the method 700 begins by receiving an indication of user intent for conducting a search for options or features of the application. This may occur, for example, by recognizing a user click on a search box in the application. The click may trigger the application to initiate examining the user's command history, at 710. This may be done to present a list of suggestions to the user based on the user's usage history. Method 700 may proceed then to examine other users' usage and search history, at 715. This may be done to provide a better and more complete list of suggestions for the user. For example, by examining other user's usage and search history, method 700 may determine that other users with similar usage histories search for certain commands after performing a similar task as the one the user recently performed. In addition to the user and other user's usage history, method 700 may examine a number of other factors such as selected or entire content of the current document, the content that was selected before, user specific information such as proficiency, location, field of work, job time, and the like, and any other metadata (e.g., time of day, day of week, day of month, etc.).

Based on this information, method 700 may proceed to generate a list of suggested commands for the user. This operation may be done by models that are trained based on one or more of the above discussed factors. The models may be local, global and/or hybrid. Once the list is generated, method 700 may display a certain number of suggested commands at the top of the list (i.e., those most relevant to the user) on the GUI screen of the application, at 725.

Method 700 may then wait until it receives input into the search box, at 730. The input may include one or more characters entered by the user. As the characters are entered, the application may examine the characters and using a predictions engine may predict what the user intends to input. Based on that information and the user, other users' activity and search histories and/or any other factors, method 700 may proceed to update the list of suggestions, at 735. Once the list is updated, it may be displayed, at 740. In this manner, the method for providing personalized search suggestions can enable the user to find information more efficiently and more effectively.

Thus, the methods for providing personalized user interfaces and personalized search suggestions store application commands the user has utilized in the past and use that data to present the user with a custom user interface surface, such as a menu, built based on their personal usage information. Additionally, the methods may utilize the user's personal usage pattern and other users' usage patterns to recommend application commands that the user would be likely to find useful. In this manner, the user could be introduced to options and commands most useful to that user which the user may otherwise not know about. This can improve the user's overall experience, increase their efficiency, their proficiency, and knowledge, and assist them in achieving their desired results. The methods may also utilize the user's and other user's usage history to offer a personalized search-based experience.

Figure 8:
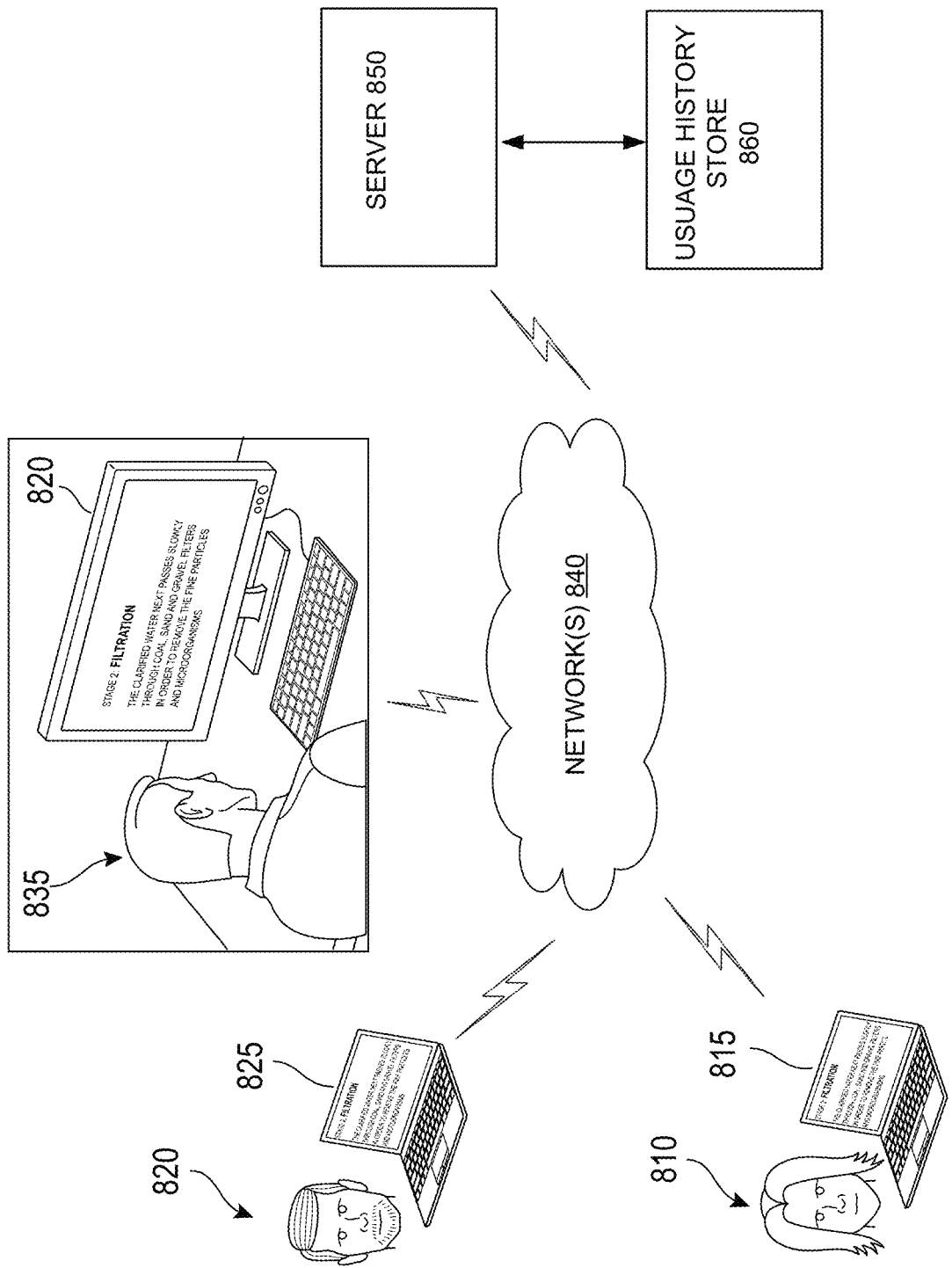
FIG. 8 illustrates an example of a representative environment for providing personalized user interface and personalized search suggestions.

FIG. 8 illustrates an example of a representative environment for providing personalized user interface and personalized search suggestions in applications. In different implementations, the environment can include a plurality of computing device users, also referred to here as users. For example, a first user 810, a second user 820, and a third user 830 are depicted in FIG. 8, using respective devices 815, 825 and 835. One or more users can interact with or utilize an application presented via a user device. As the users perform various activities in their respective versions of the application, their usage history may be transmitted to a server 850 via one or more networks which may in turn transmit the data to a data store 860. The usage history may be transmitted in batches at different times. For example, the usage history may be stored locally on each of the user devices and transmitted each time the current user session is finished (e.g., the user closes the application).

As a general matter, the methods and systems described herein may include, or otherwise make use of, a machine-trained model to determine how to personalize menus and search suggestions in an application. As an example, a system can be trained using data generated by machine learning (ML) model in order to identify patterns in user activity, determine associations between various application commands and tasks, and/or identify suggested application options for a given user. Such determination may be made following the accumulation, review, and/or analysis of usage history data from a large number of users over time, that may be configured to provide the ML algorithm (MLA) with an initial or ongoing training set. As a general example, a number of command events used to serve as a baseline for training can range from 20 to over 1,000,000. In addition, in some implementations, a user device can be configured to transmit data captured locally during use of the relevant application(s) to the cloud or the local ML program and provide supplemental training data that can serve to fine-tune or increase the effectiveness of the MLA. The supplemental data can also be used to facilitate identification of command or option suggestions and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, a size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

In some implementations, the ML models and/or their corresponding classification systems can be configured to use, among other things, machine learning and inference techniques to patterns in user activity, determine associations between various application commands and tasks, and/or identify suggested application options based on data collected during use of the system. In some implementations, machine learning techniques may generate one or more models for identifying and/or characterizing events based on a corpus of training data in the form of labeled or otherwise previously characterized data. Furthermore, the training data may be continually updated and one or more of the models used by the classification system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

Various ML algorithms and techniques for training ML models are discussed in U.S. Patent Application Publication Numbers 2013/0346346 (published on Dec. 26, 2013 and entitled "Semi-Supervised Random Decision Forests for Machine Learning"), 2014/0122381 (published on May 1, 2014 and entitled "Decision Tree Training in Machine Learning"), 2014/0172753 (published on Jun. 19, 2014 and entitled "Resource Allocation for Machine Learning"), 2015/0248764 (published on Sep. 3, 2015 and entitled "Depth Sensing Using an Infrared Camera"), 2015/0248765 (published on Sep. 3, 2015 and entitled "Depth Sensing Using an RGB Camera"), 2017/0132496 (published on May 11, 2017 and entitled "Hardware-Efficient Deep Convolutional Neural Networks"), 2017/0206431 (published on Jul. 20, 2017 and entitled "Object Detection and Classification in Images"), 2017/0236286 (published on Aug. 17, 2017 and entitled "Determining Depth from Structured Light Using Trained Classifiers"), U.S. patent application Ser. No. 15/870,783 (filed on Jan. 12, 2018 and entitled "Automated Collection of Machine Learning Data"), and 2017/0262768 (published on Sep. 14, 2017 and entitled "Depth from Time-of-Flight Using Machine Learning"), which are each incorporated by reference herein in their entireties.

Thus, in different implementations, a machine learning model can be developed that is configured to identify with high confidence and precision application features a given user may find useful. In some implementations, the ML model can obtain reinforcement signals to improve the model and better account for user intentions. As a preliminary modeling paradigm, some implementations can make use of one or more bootstrapping algorithms to provide approximations of these predictions.

Figure 9:
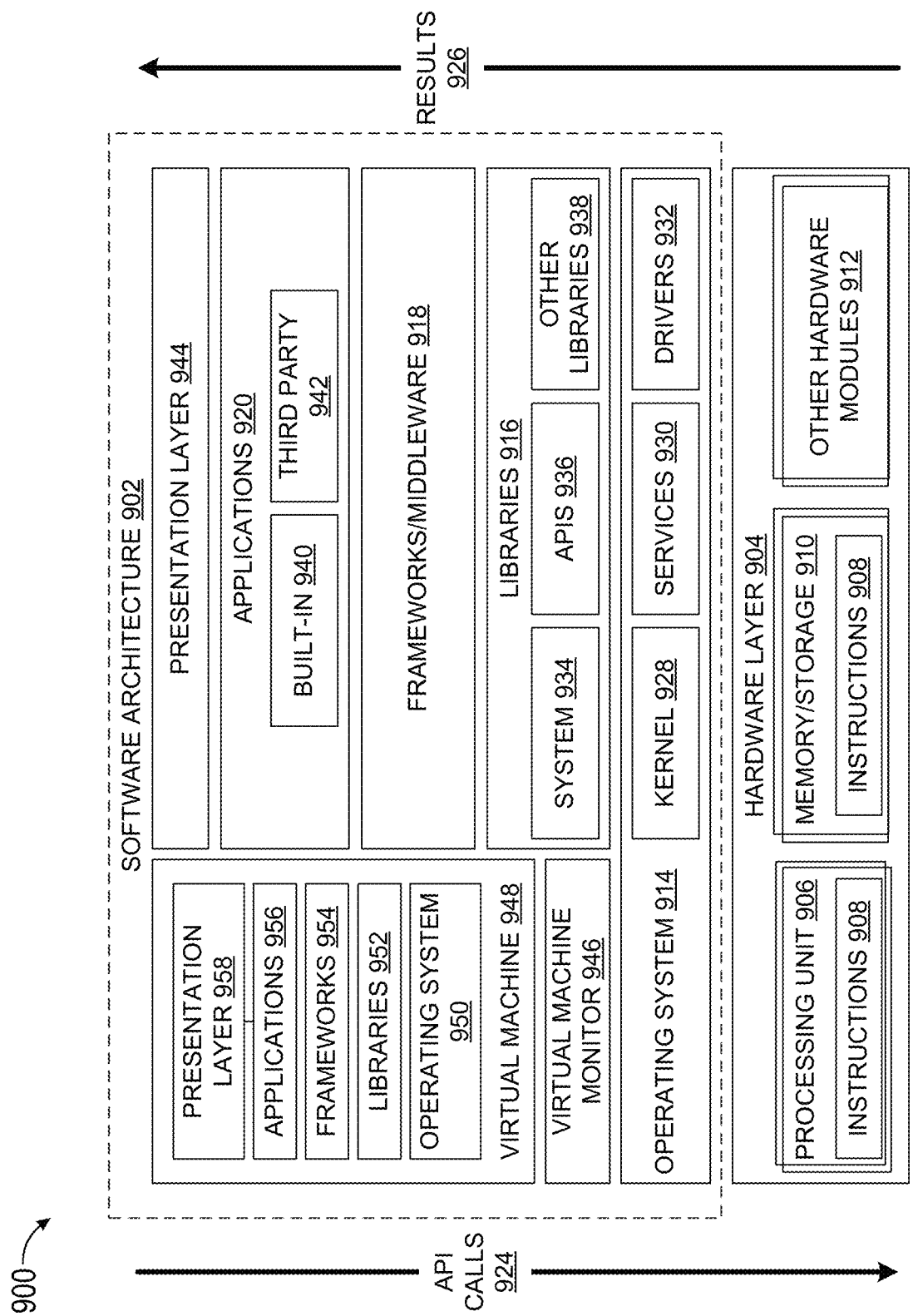
FIG. 9 is a block diagram illustrating an example software architecture, various portions of which may be used in conjunction with various hardware architectures herein described.

FIG. 9 is a block diagram 900 illustrating an example software architecture 902, various portions of which may be used in conjunction with various hardware architectures herein described, which may implement any of the above-described features. FIG. 9 is a non-limiting example of a software architecture and it will be appreciated that many other architectures may be implemented to facilitate the functionality described herein. The software architecture 902 may execute on hardware such as client devices, native application provider, web servers, server clusters, external services, and other servers. A representative hardware layer 904 includes a processing unit 906 and associated executable instructions 908. The executable instructions 908 represent executable instructions of the software architecture 902, including implementation of the methods, modules and so forth described herein.

The hardware layer 904 also includes a memory/storage 910, which also includes the executable instructions 908 and accompanying data. The hardware layer 904 may also include other hardware modules 912. Instructions 508 held by processing unit 908 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 924. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various GUI functions, high-level resource management, or high-level location services. The frameworks 918 may provide a broad spectrum of other APIs for applications 920 and/or other software modules.

The applications 920 include built-in applications 920 and/or third-party applications 922. Examples of built-in applications 920 may include, but are not limited to, a contacts application, a browser application, a location application, a media application, a messaging application, and/or a game application. Third-party applications 922 may include any applications developed by an entity other than the vendor of the particular system. The applications 920 may use functions available via OS 914, libraries 916, frameworks 918, and presentation layer 924 to create user interfaces to interact with users.

Some software architectures use virtual machines, as illustrated by a virtual machine 928. The virtual machine 928 provides an execution environment where applications/modules can execute as if they were executing on a hardware machine (such as the machine 900 of FIG. 9, for example). The virtual machine 928 may be hosted by a host OS (for example, OS 914) or hypervisor, and may have a virtual machine monitor 926 which manages operation of the virtual machine 928 and interoperation with the host operating system. A software architecture, which may be different from software architecture 902 outside of the virtual machine, executes within the virtual machine 928 such as an OS 950, libraries 952, frameworks 954, applications 956, and/or a presentation layer 958.

Figure 10:
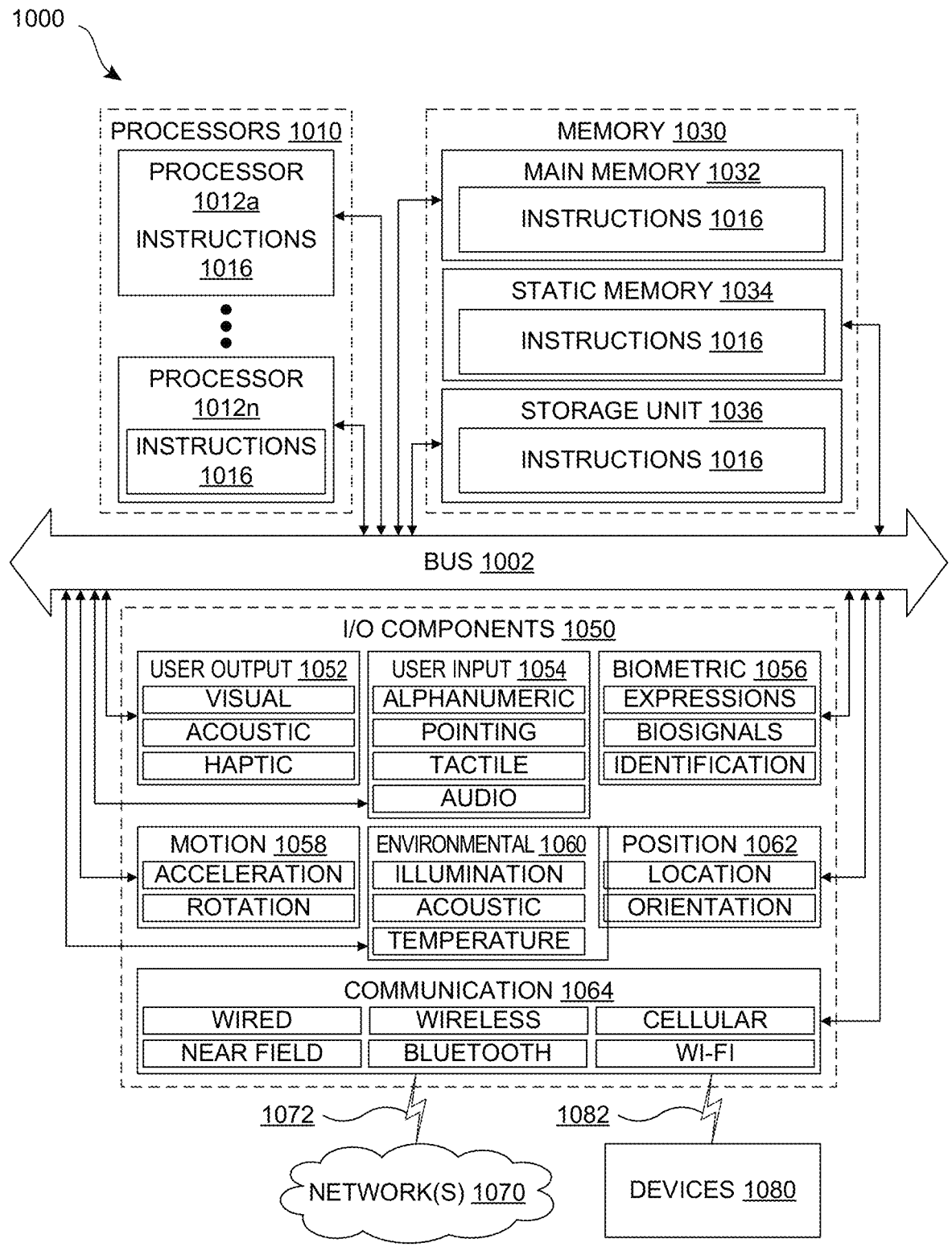
FIG. 10 is a block diagram illustrating components of an example machine configured to read instructions from a machine-readable medium and perform any of the features described herein.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement methods or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" includes a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012a to 1012n that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056 and/or position components 1062, among a wide array of other environmental sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
one or more processors; and
a memory in communication with the one or more processors, the memory comprising executable instructions that, when executed by, the one or more processors, cause the device to perform functions of:
examining a history of a user's usage of an application by a user;
examining a history of usage of the application by one or more other users;
providing the history of the user's usage of the application and the history of usage of the application by the one or more other users as inputs to one or more machine-learning (ML) models;
receiving as an output from of the one or more ML models one or more first suggested features offered by the application, the one or more suggested features offered by the application being identified by the one or more ML models based on the history of the user's usage and the history of the usage of the application by the one or more other users;
generating a first list of the one or more first suggested features; and
providing the first list of the one or more first suggested features for being displayed as part of a personalized user interface,
wherein the one or more other users include at least one user whose history of usage of the application includes at least one of one or more recently used activities of the at least one user.

2. The device of claim 1, wherein the instructions further cause the one or more processors to cause the device to perform functions of:
identifying one or more recently used activities of the user;
identifying one or more second suggested options offered by the application based on at least one of the history of the user's usage of the application, the one or more recently used activities, the history of usage of the application by the one or more other users, or the one or more first suggested features;
generating a second list of the one or more second suggested options;
providing the second list of the one or more second suggested options for being displayed as part of the personalized user interface.

3. The device of claim 2, wherein the instructions further cause the one or more processors to cause the device to perform functions of examining content of a current document the user is using in the application and identifying the one or more first suggested features or the one or more second suggested options based at least in part on the content of the current document.

4. The device of claim 2, wherein the second list of the one or more second suggested options includes a list of options for activities the user can perform in the application next based at least in part on the one or more recently used activities of the user or on content of a current document being used by the user in the application.

5. The device of claim 2, wherein the second list of the one or more second suggested options includes a list of options for activities the one or more other users have performed in the application next based at least in part on the one or more recently used activities of the user, and the history of usage of the application by one or more other user.

6. The device of claim 2, wherein at least one of the history of the user's usage of the application or the history of usage of the application by the one or more other users is for usage history of the application across multiple sessions.

7. The device of claim 1, wherein the instructions further cause the one or more processors to cause the device to perform functions of:
receiving data relating to the user's usage history of the application across a network; and
storing the data relating to the user's usage history of the application.

8. The device of claim 1, wherein the generating of the first list of the one or more first suggested features is performed by a server that is remote to a device used by the user to access the application.

9. The device of claim 1, wherein the instructions further cause the one or more processors to cause the device to perform functions of presenting personalized options for one or more commands displayed in a personalized menu.

10. A method for providing a personalized user interface for an application comprising:
examining a history of a user's usage of the application by a user;
examining a history of usage of the application by one or more other users;
providing the history of the user's usage of the application and the history of usage of the application by the one or more other users as inputs to one or more machine-learning (ML) models;
receiving as an output from of the one or more ML models one or more first suggested features offered by the application, the one or more suggested features offered by the application being identified by the one or more ML models based on the history of the user's usage and the history of the usage of the application by the one or more other users;
generating a first list of the one or more first suggested features; and
providing the first list of the one or more first suggested features for being displayed as part of a personalized user interface,
wherein the one or more other users include at least one user whose history of usage of the application includes at least one of one or more recently used activities of the at least one user.

11. The method of claim 10, further comprising:
identifying one or more recently used activities of the user;
identifying one or more second suggested options offered by the application based on at least one of the history of the user's usage of the application, the one or more recently used activities, the history of usage of the application by one or more other users, or the one or more first suggested features;

generating a second list of the one or more second suggested options;

providing the second list of the one or more second suggested options for being displayed as part of the personalized user interface.

12. The method of claim 11, further comprising examining content of a current document the user is using in the application and identifying the one or more first suggested features or the one or more second suggested options based at least in part on the content of the current document.

13. The method of claim 11, wherein at least one of the history of the user's usage of the application or the history of usage of the application by the one or more other users is for usage history of the application across multiple sessions.

14. The method of claim 11, wherein the second list of the one or more suggested features includes a list of options for activities the user can perform in the application next based at least in part on the one or more recently used activities of the user or on content of a current document being used by the user in the application.

15. The method of claim 11, wherein the second list of the one or more second suggested options includes a list of options for activities the one or more other users have performed in the application next based at least in part on the one or more recently used activities of the user and the history of usage of the application by one or more other user.

16. A device comprising:
one or more processors; and
a memory in communication with the one or more processors, the memory comprising executable instructions that, when executed by, the one or more processors, cause the device to perform functions of:
examining a history of a user's usage of an application by a user;
providing the history of the user's usage of the application as an input to one or more machine-learning (ML) models;
receiving as an output from of the one or more ML models one or more first search suggestions, the one or more first search suggestions being identified by the one or more ML models based on the history of the user's usage;
generating a first list of the one or more first search suggestions;

providing the list of the one or more first search suggestions for being displayed to the user for selection as part of the user's search within the application.

17. The device of claim 16, wherein the instructions further cause the one or more processors to cause the device to perform functions of:
identifying one or more recently used activities of the user;
examining a history of searches conducted in the application by one or more other users of the application;
identifying one or more second search suggestions based on at least one of the one or more recently used activities or the history of searches conducted in the application by the one or more other users of the application;
generating a second list of the one or more second search suggestions;
providing the second list of the one or more second search suggestions for being displayed to the user for selection as part of the user's search within the application.

18. The device of claim 17, wherein the one or more second search suggestions are identified based on a history of searches conducted in the application by one or more other users of the application who recently performed the one or more recently used activities of the user or based on content of a document currently being used by the user in the application.

19. The device of claim 17, wherein the instructions further cause the one or more processors to cause the device to perform functions of:
receive one or more characters entered in a search box;
predict one or more intended search suggestions based on the one or more characters;
update the second list of the one or more second search suggestions based at least on one of the one or more intended search suggestions and the history of search suggestions used in the application by one or more other users of the application who recently performed the one or more recently used activities of the user; and
provide the updated second list of the one or more second search suggestions for being displayed to the user.

* * * * *